(12) United States Patent
Levkov et al.

(10) Patent No.: US 11,956,551 B2
(45) Date of Patent: Apr. 9, 2024

(54) SYSTEMS AND METHODS FOR CAMERA EXPOSURE CONTROLLED STROBING LIGHTS

(71) Applicant: Microsoft Technology Licensing, LLC, Redmond, WA (US)

(72) Inventors: Vladimir Levkov, Belgrade (RS); Vladimir Carapic, Belgrade (RS); Teo Šarkić, Belgrade (RS); Jelena Mojasevic Katanic, Belgrade (RS); Predrag Rodoljub Jovanovic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 17/828,918

(22) Filed: May 31, 2022

(65) Prior Publication Data
US 2023/0388649 A1    Nov. 30, 2023

(51) Int. Cl.
*H04N 23/72* (2023.01)

(52) U.S. Cl.
CPC .................................. *H04N 23/72* (2023.01)

(58) Field of Classification Search
CPC ...................................................... H04N 23/72
See application file for complete search history.

(56) References Cited

U.S. PATENT DOCUMENTS

| 9,060,113 | B2 * | 6/2015 | Rhoads | .................. | H04N 23/74 |
| 10,420,181 | B2 | 9/2019 | Ganick et al. | | |
| 10,560,188 | B2 | 2/2020 | Jang et al. | | |
| 2012/0104962 | A1 * | 5/2012 | Chen | ...................... | H05B 45/38 |
| | | | | | 315/227 R |
| 2015/0281622 | A1 * | 10/2015 | Fujihashi | ............... | H04N 23/66 |
| | | | | | 348/294 |

(Continued)

FOREIGN PATENT DOCUMENTS

| CN | 215453041 U | 1/2022 |
| JP | 2012248992 A | 12/2012 |

(Continued)

OTHER PUBLICATIONS

"LiteMat Plus 4", Retrieved from: https://web.archive.org/web/20210301220537/https:/www.litegear.com/product/litemat-plus-4-2/, Mar. 1, 2021, 5 Pages.

(Continued)

*Primary Examiner* — Shahbaz Nazrul
(74) *Attorney, Agent, or Firm* — RAY QUINNEY & NEBEKER P.C.; John O. Carpenter (57) ABSTRACT

An electronic device includes a light source, a communication device, a processor in data communication with the light source and the communication device, and a hardware storage device in data communication with the processor. The hardware storage device has instructions stored thereon that, when executed by the processor, cause the electronic device to receive a timing signal from a camera, where the timing signal includes an exposure timing of a camera exposure; provide an exposure light pulse from the light source simultaneously with the camera exposure; and after providing the exposure light pulse, provide a dummy light pulse that does not overlap with a camera exposure.

20 Claims, 3 Drawing Sheets

(56) References Cited

U.S. PATENT DOCUMENTS

| | | | |
|---|---|---|---|
| 2016/0105597 A1* | 4/2016 | Ke | G03B 7/16 |
| | | | 348/362 |
| 2018/0091720 A1 | 3/2018 | Edwards | |
| 2020/0204719 A1* | 6/2020 | Masuda | G03B 7/16 |
| 2020/0213500 A1* | 7/2020 | Kobayashi | G03B 15/05 |
| 2020/0382689 A1* | 12/2020 | Oh | H04N 23/72 |
| 2021/0133407 A1 | 5/2021 | Kowalewski et al. | |

FOREIGN PATENT DOCUMENTS

| | | |
|---|---|---|
| WO | 2004008742 A2 | 1/2004 |
| WO | 2021017397 A1 | 2/2021 |

OTHER PUBLICATIONS

Hu, et al., "High Speed LED-to-Camera Communication using Color Shift Keying with Flicker Mitigation", In Journal of IEEE Transactions on Mobile Computing, vol. 19, Issue 7, Jul. 1, 2020, pp. 1603-1616.

"International Search Report and Written Opinion Issued in PCT Application No. PCT/US2023/018258", dated Jun. 30, 2023, 9 Pages.

* cited by examiner

SYSTEMS AND METHODS FOR CAMERA EXPOSURE CONTROLLED STROBING LIGHTS

BACKGROUND

Background and Relevant Art

Recording video for three-dimensional reconstruction conventionally requires high output studio lights whose brightness is very uncomfortable for the human subject being recorded. Studio lighting intensity can be adjusted, but studio lighting constantly illuminates the scene to the brightness required for recording even though the camera exposes only a fraction of that time.

BRIEF SUMMARY

In some embodiments, an electronic device includes a light source, a communication device, a processor in data communication with the light source and the communication device, and a hardware storage device in data communication with the processor. The hardware storage device has instructions stored thereon that, when executed by the processor, cause the electronic device to receive a timing signal from a camera, where the timing signal includes an exposure timing of a camera exposure; provide an exposure light pulse from the light source simultaneously with the camera exposure; and after providing the exposure light pulse, provide a dummy light pulse that does not overlap with a camera exposure.

In some embodiments, a system includes a light source, a camera, and a means for coordinating the camera and light source. The means for coordinating the light source and the camera is configured to coordinate a first exposure of the camera with a first exposure light pulse of the light source, a second camera exposure of the camera with a second exposure light pulse of the light source, and at least one dummy light pulse of the light source between the first exposure and the second exposure.

In some embodiments, a method of providing light to a subject includes receiving a timing signal from a camera, wherein the timing signal includes an exposure timing of a camera exposure; providing an exposure light pulse simultaneously with at least a portion of the camera exposure; and providing a dummy light pulse after the exposure light pulse that is not simultaneous with any camera exposure with a dead time between the exposure light pulse and dummy light pulse.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure generally relates to systems and methods for controlling a light source. More particularly, the present disclosure relates to coordinating a light source with a camera exposure to provide light during the camera exposure. High resolution imaging and three-dimensional imaging of a subject can require high levels of illumination of the subject. This high illumination, in the example a human subject, can cause discomfort to the subject.

In some embodiments, a camera used for imaging a subject has a camera exposure within a frame time. For example, a frame time of camera capturing images at 30 frames per second (FPS) is approximately 33 milliseconds (ms). The camera exposure duration for each frame is less than the frame time to allow the camera to collect a light signal with a photoreceptor array during the camera exposure duration, process the light signal, read out the frame information to memory, and reset the photoreceptor array in preparation for a second frame time. The camera, therefore, only collects a light signal during the camera exposure duration, and excess illumination of the subject during the remainder of the frame time, which can be greater than 90% of the frame time, has little to no effect on the light signal captured by the camera. The excess illumination of the subject, however, may have a negative effect on the subject.

The subject can experience discomfort or disorientation from the high level of illumination during the video recording session. In some embodiments, a light source is configured to provide high brightness illumination to the subject during at least a portion of the camera exposure duration and less illumination in the remaining frame time between the camera exposures. Illuminating the subject only during the camera exposures, however, can result in a flickering of the light source that is evident to the subject. For example, a light source that emits light for the camera exposure duration for each frame time of a 30 FPS camera (e.g., light pulses of 2 ms every 33 ms) produces a visible strobing effect that can also cause a subject discomfort or disorientation during the video recording session.

In some embodiments, systems and methods according to the present disclosure provide an exposure light pulse of sufficiently high brightness during at least a portion of the camera exposure and at least one dummy pulse during the frame time before the temporally next camera exposure and exposure light pulse. By pulsing the light source, the total light flux from the light source during a frame time is reduced while the camera receives a light signal of high brightness. In some embodiments, introducing dummy pulses into the light source pulse sequence increases the frequency of the light pulses (and decreases the duration of dead time between light pulses) such that the subject perceives a continuous light source of a lower brightness. The subject perceives the rapid light pulses as a continuous light source. The reduction in total light flux from the pulsing contributes to the perception of the continuous source. The reduction in total light flux from the light source also reduces the power consumption of the light source, reducing environmental impact. In the event of video or photography sessions in remote locations or other locations with limited electricity availability, the reduction in total light flux from the light source also reduces power consumption from a battery or other power storage, allowing for smaller batteries or longer sessions.

Figure 1:
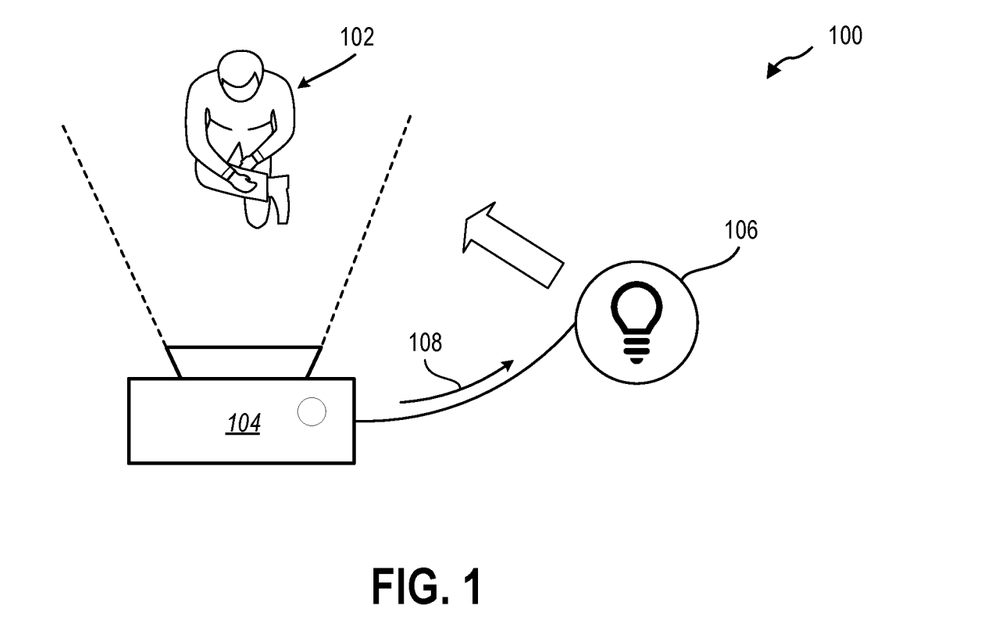
FIG. 1 is an overhead schematic view of a system for imaging a subject, according to at least some embodiments of the present disclosure.

FIG. 1 is an overhead schematic diagram of an embodiment of a system 100 for imaging a subject 102. In some embodiments, the system 100 includes a camera 104 and a light source 106 in data communication with the camera 104. For example, the light source 106 may include one or more light emitting diodes (LEDs). LEDS can provide nano-second response times to allow short light pulses with relatively high timing precision. In some embodiments, the camera 104 includes an electronic shutter. The electronic shutter may be a rolling shutter or a global shutter. A rolling shutter will read a camera sensor from top to bottom. Pixels on the top of the camera sensor will switch on first for the exposure, and the active pixels of the camera sensor "roll" down to the bottom. In some embodiments, the camera 104 includes a global shutter. Global shutters operate by exposing the whole scene from top to bottom all at once. Instead of having pixels from the top of the sensor switch on and work its way down like a scan, the sensor takes snap of the scene using all of the pixels all at once.

In some embodiments, the camera 104 sends a timing signal 108 to the light source 106 to illuminate the subject 102. The light source 106 emits a plurality of light pulses at least partially according to the timing signal received from the camera 104. In some embodiments, the timing signal 108 includes an exposure timing that indicates to the light source 106 when the camera exposure begins. In some embodiments, the timing signal 108 includes an exposure duration that indicates to the light source 106 how long the shutter of the camera remains open during the camera exposure. In some embodiments, a processor of the light source 106 receives the timing signal from the camera 104 and, based at least partially on the timing signal, calculates a light pulse timing including light pulse quantities and light pulse durations during the frame time.

The light source 106 illuminates the subject 102 during at least a portion of the camera exposure to provide a light signal to the camera 104. In some embodiments, the timing signal 108 further includes a frame timing that indicates the frame rate or frame time of the camera 104. In some embodiments, the light source 106 also provides at least one dummy light pulse in the frame time after the exposure light pulse and before the next camera exposure. While the embodiments described in relation to FIG. 1 includes a timing signal 108 sent from the camera 104 directly to the light source 106, in other embodiments, a timing controller receives the timing signal from the camera and transmits one or more light signals to the light source to control a timing of the light pulses based at least partially on the timing signal.

Figure 2:
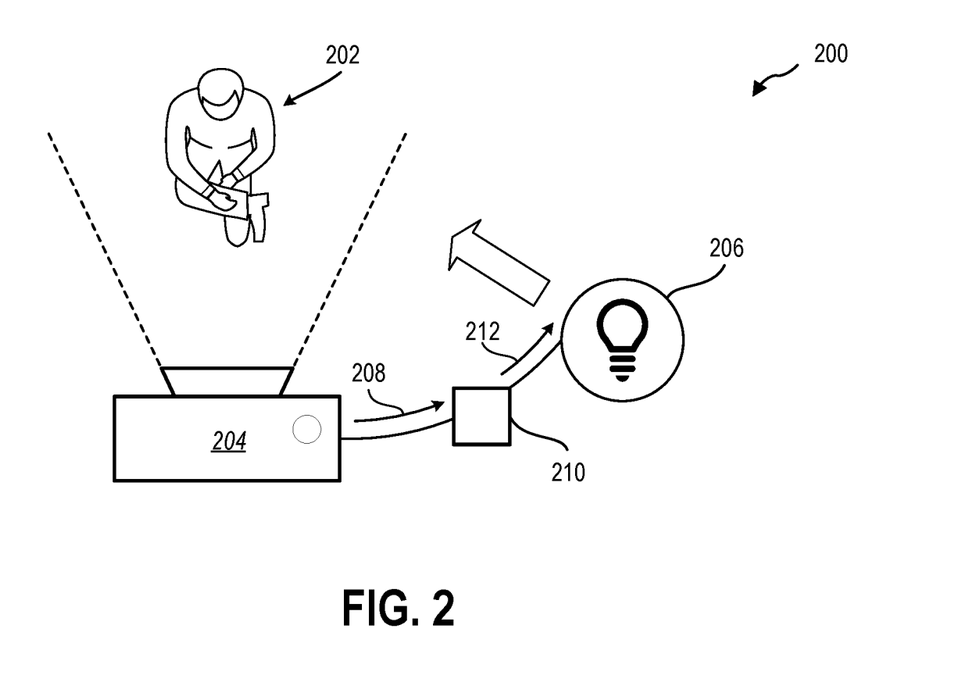
FIG. 2 is an overhead schematic view of another system for imaging a subject, according to at least some embodiments of the present disclosure.

FIG. 2 is an overhead schematic diagram of another embodiment of a system 200 with a timing controller 210 in data communication between the camera 204 and the light source 206. For example, the timing controller 210 receives the timing signal 208 from the camera 204 and, based at least partially on the timing signal, calculates a light pulse timing including light pulse quantities and light pulse durations during the frame time. The timing controller 210 then sends a light pulse instructions 212 to the light source 206 to illuminate the subject 202 according to the light pulse timing.

Figure 3:
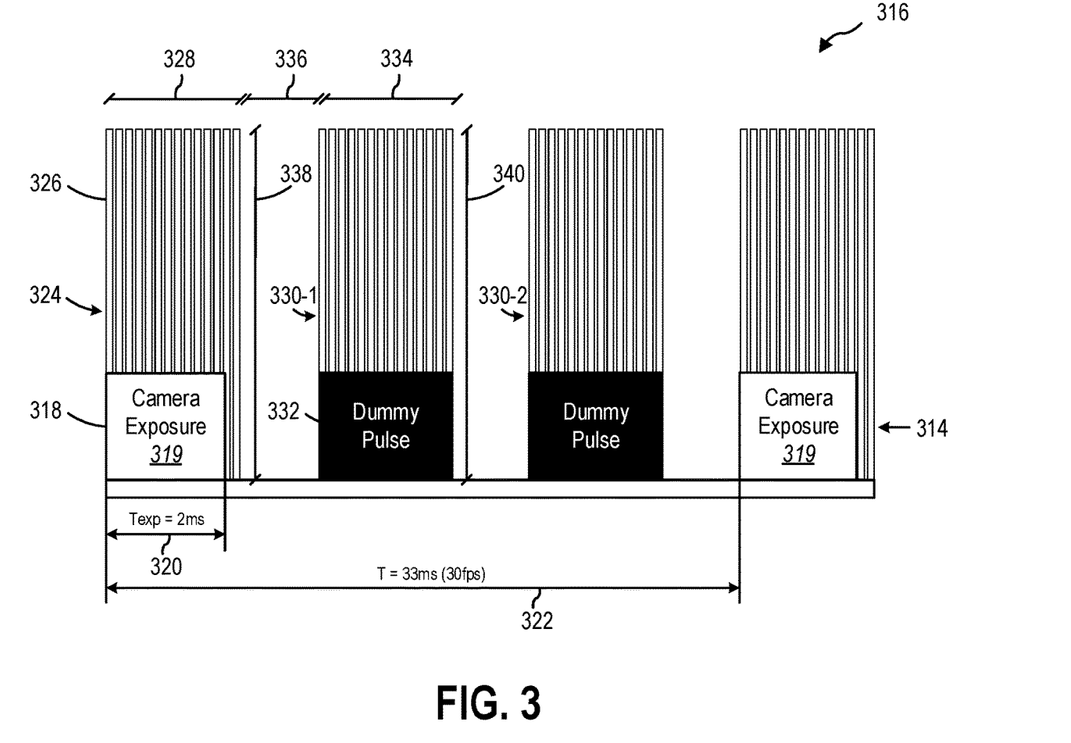
FIG. 3 is an embodiment of exposure timing and light pulse timing, according to at least some embodiments of the present disclosure.

FIG. 3 is a timing diagram that overlays the exposure timing 314 with the light pulse timing 316. In some embodiments, the exposure timing 314 includes a camera exposure start time 318 of a camera exposure 319. The camera exposure start time 318 indicates when the global shutter of the camera opens (e.g., when the photoreceptor array of the camera sensor becomes active) or when the rolling shutter of the camera opens (e.g., when the first pixels of photoreceptor array of the camera sensor become active). The camera exposure 319 has a camera exposure duration 320, and the exposure timing 314 has a frame time 322 that is the period between the camera exposures 319. In some embodiments, the camera exposure duration 320 reflects the amount of time the camera sensor is active and collecting the light signal. The remaining portion of the frame time 322 includes signal read out to memory, sensor reset, and other processes to prepare the camera sensor before then next frame.

In some embodiments, an exposure light pulse 324 at least partially overlaps the camera exposure 319. In some examples, the exposure light pulse 324 has an exposure light pulse start 326 that is the same as the camera exposure start 318. In some examples, the exposure light pulse 324 has an exposure light pulse start 326 that is before the camera exposure start 318. For example, the exposure light pulse 324 has an exposure light pulse start 326 that is after the camera exposure start 318.

In some examples, the exposure light pulse 324 has an exposure light pulse duration 328 that is the same as the camera exposure duration 320. In some examples, the exposure light pulse 324 has an exposure light pulse duration 328 that is greater than the camera exposure duration 320. In some examples, the exposure light pulse 324 has an exposure light pulse duration 328 that is less than the camera exposure duration 320. In at least one example, the exposure light pulse 324 has an exposure light pulse start 326 that is the same as the camera exposure start 318 and an exposure light pulse duration 328 that is the same as the camera exposure duration 320 such that the exposure light pulse 324 starts and ends at the same time as the camera exposure 319. In at least one example, the exposure light pulse 324 has an exposure light pulse start 326 that is the same as the camera exposure start 318 and the exposure light pulse 324 has an exposure light pulse duration 328 that is greater than the camera exposure duration 320 to ensure the camera exposure is fully illuminated.

As described herein, a light source that provides light only during the camera exposure will ensure the camera exposure is fully illuminated, but the light source will also create a visible strobing or flicker effect to a subject. In some embodiments, the light pulse timing 316 includes at least one dummy light pulse 330-1, 330-2 that provided by the light source before the next camera exposure and/or exposure light pulse. In some embodiments, the light pulse timing 316 includes a single dummy light pulse 330-1. In some embodiments, the light pulse timing 316 includes a plurality of dummy pulses 330-1, 330-2.

Through experimentation, human subjects perceive the pulsed light source as a continuous light source when the light pulse timing provides light pulses at least 20% of the time when a dead time 336 between light pulses (e.g., the exposure light pulses 324 and the dummy light pulses 330-1, 330-2) is less than 15 ms. For example, three light pulses of 2.2 ms each (exposure light pulse duration 328 and dummy light pulse duration 334) in a 33 ms frame time 322 provides a 20% duty cycle within the frame time 322 (6.6 ms/33 ms=0.20).

In some embodiments, the dead time 336 between each light pulse is equal, such that the period between the light pulses and/or light pulse starts (e.g., exposure light pulse start 326 and dummy light pulse start 332) are located at equal intervals within the frame time 322 to further create the perception of a continuous light source. For example, the dead time 336 between the pulses is 8.8 ms in the described embodiment ((2.2 ms+8.8 ms)*3=33 ms). In some embodiments a first dead time 336 between two light pulses and a second dead time between other light pulses are different. For example, in some embodiments, an exposure light pulse duration 328 may be greater than a dummy light pulse duration 334, and a dead time 336 therebetween may be greater than a dead time between the dummy light pulse and another light pulse.

The described embodiments includes dummy light pulse durations that are constant. In some embodiments, a dummy light pulse duration 334 of a first dummy light pulse 330-1 is greater than that of a second dummy light pulse 330-2. In some embodiments, a dummy light pulse duration 334 of a first dummy light pulse 330-1 is less than that of a second dummy light pulse 330-2.

In some embodiments, an exposure light pulse intensity 338 is selected based at least partially on the brightness of the light signal desired at the camera sensor. In some embodiments, a dummy light pulse intensity 338 is substantially the same as the exposure light pulse intensity 338. In some embodiments, a dummy light pulse intensity 340 is greater than the exposure light pulse intensity 338. In some embodiments, a dummy light pulse intensity 340 is less than the exposure light pulse intensity 338.

In some embodiments, an exposure light pulse intensity 338 and/or a dummy light pulse intensity 340 has a brightness value at the subject of at least 500 lux. Below 500 lux, most human subjects experience little discomfort. In some embodiments, an exposure light pulse intensity 338 and/or a dummy light pulse intensity 340 has a brightness value at the subject of at least 750 lux. In some embodiments, an exposure light pulse intensity 338 and/or a dummy light pulse intensity 340 has a brightness value at the subject of at least 1000 lux. In some embodiments, an exposure light pulse intensity 338 and/or a dummy light pulse intensity 340 has a brightness value at the subject of at least 2000 lux. Because the brightness of the light pulses is perceived as distributed over the frame time, a higher brightness can be used than would otherwise be comfortable for a user.

Figure 4:
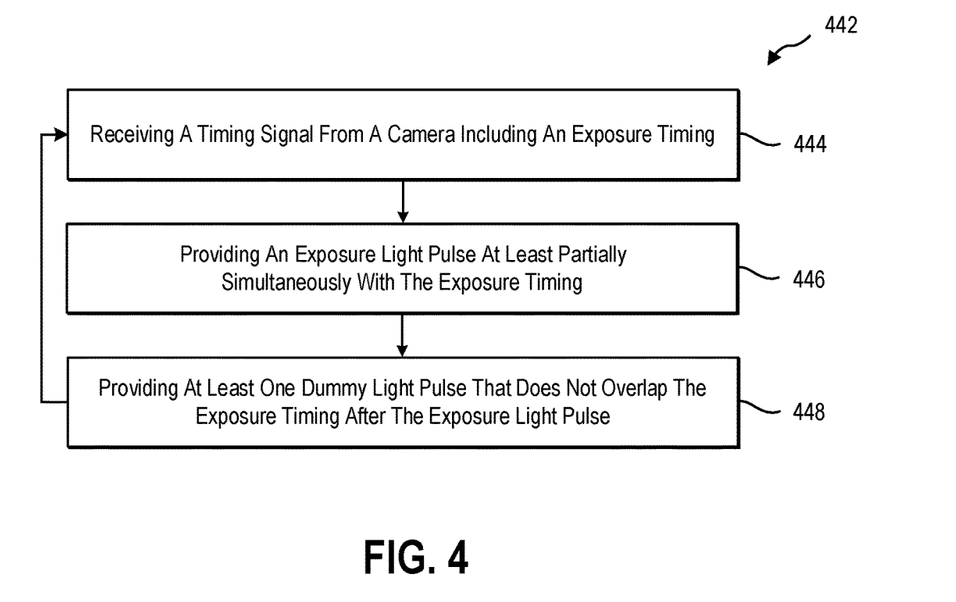
FIG. 4 is a flowchart illustrating a method of controlling a light source, according to at least some embodiments of the present disclosure.

FIG. 4 is a flowchart illustrating a method 442 of controlling a light source. In some embodiments, the method 442 includes receiving a timing signal from a camera, where the timing signal includes an exposure timing at 444. In some embodiments, the timing signal includes a camera exposure duration and/or a camera exposure start time.

In some embodiments, a means for coordinating the light source and the camera receives the timing signal and provides instructions to at least one component of the light source to provide an exposure light pulse at least partially simultaneously (e.g., temporally overlapping) with the exposure timing of the camera exposure at 446.

In some embodiments, a means for coordinating the light source and the camera includes a processor in the light source that receives the timing signal from the camera and send an electrical signal to the LEDs or other light emitting component of the light source to provide an exposure light pulse. In some embodiments, a means for coordinating the light source and the camera includes a processor in the camera that receives the timing signal from the sensor firmware and sends instructions to at least one component of the light source to provide an exposure light pulse. In some embodiments, a means for coordinating the light source and the camera includes a timing controller in data communication with the light source and that receives the timing signal from the camera.

The method 442 further includes providing instructions to at least one component of the light source to provide a dummy light pulse at least partially simultaneously (e.g., temporally overlapping) with the exposure timing of the camera exposure at 448. In some embodiments, the means for coordinating the light source and the camera calculates a dummy pulse timing of the dummy light pulse based at least partially on the timing signal. For example, the timing signal includes a frame time. In some embodiments, calculating a dummy pulse timing of the dummy light pulse based at least partially on the timing signal by dividing the frame time into equal intervals and setting the exposure light pulse start and the dummy light pulse start(s) at the equal intervals.

In some embodiments, the method 442 includes providing a plurality of light pulses (i.e., exposure light pulse and dummy light pulse(s)) based on ensuring the light pulses sum to at least 20% of the frame time and a dead time between light pulses is no greater than 15 ms. In some embodiments, the method 442 includes providing a plurality of light pulses (i.e., exposure light pulse and dummy light pulse(s)) based on ensuring the light pulses sum to at least 25% of the frame time and a dead time between light pulses is no greater than 10 ms.

Figure 5:
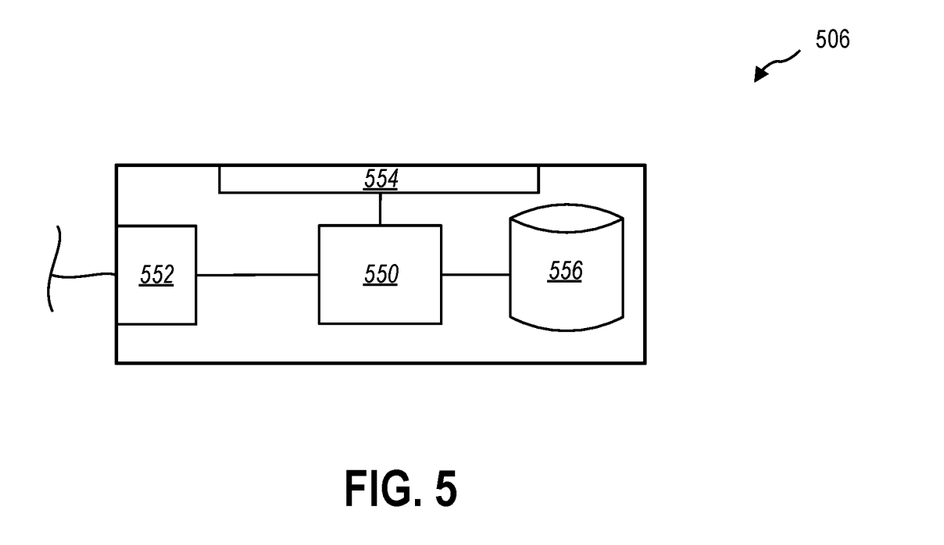
FIG. 5 is a schematic representation of a light source, according to at least some embodiments of the present disclosure.

FIG. 5 is a system diagram of a light source 506 including a processor 550 in data communication with a communication device 552 to receive timing signals from a camera. The processor 550 is further in electrical communication with the light emitting component 554 (such an LED array) to control the light pulses from the light source 506. In some embodiments, the light emitting component 554 includes or is partially controlled by a pulse width modulator (PWM). In some embodiments, the pulse intensity is regulated by at least a 20 kilohertz (kHz) PWM. In some embodiments, the pulse intensity is regulated by at least a 50 kHz PWM. In some embodiments, the pulse intensity is regulated by at least a 100 kHz PWM.

In some embodiments, the processor 550 of the light source 506 is in data communication with a hardware storage device 556. The hardware storage device 556 may have instructions stored thereon that, when executed by the processor, cause the light source to perform any of the methods described herein.

In some embodiments, the hardware storage device 556 is any non-transient computer readable medium that may store instructions thereon. The hardware storage device 556 may be any type of solid-state memory; volatile memory, such as static random access memory (SRAM) or dynamic random access memory (DRAM); or non-volatile memory, such as read-only memory (ROM) including programmable ROM (PROM), erasable PROM (EPROM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media.

In some embodiments, the communication device 552 is a wireless communication device. For example, the wireless communication device may provide radio frequency wireless communication, such as a Wi-Fi communication device, a Bluetooth communication device, or a near-field communication NFC communication device. In other examples, the wireless communication device may provide optical wireless communications, such as an infrared wireless communication device.

In some embodiments, the communication device 552 is a wired communication device. For example, the wired communication device may provide electrical signal communication, such as a coaxial wired communication device or an Ethernet wired communication device. In another example, the wired communication device may provide optical wired signal communication, such as a fiber optic wired communication device. In some embodiments, a wired communication device may provide faster communication times with less risk of dropped data packets or interference in communication than a wireless communication device.

Figure 6:
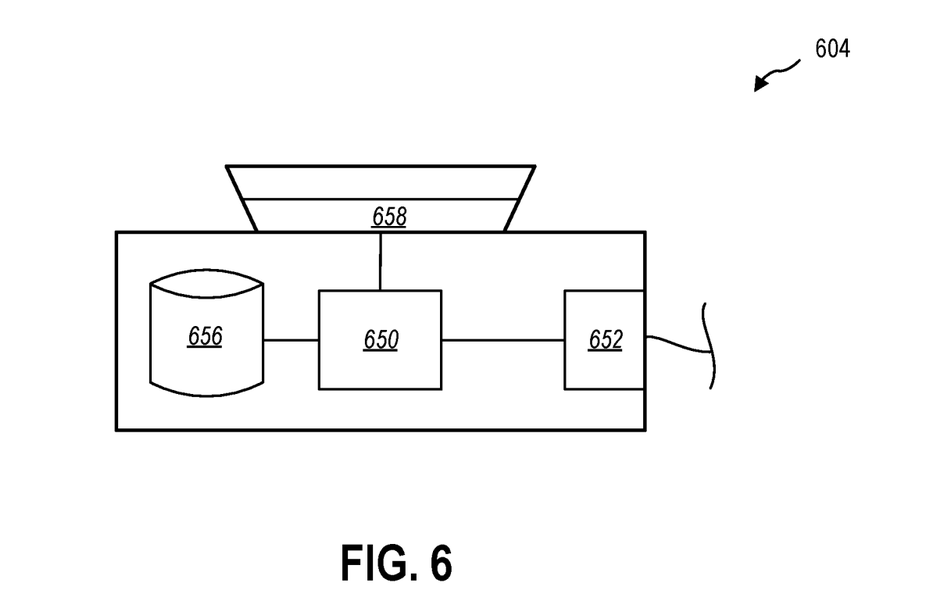
FIG. 6 is a schematic representation of a camera, according to at least some embodiments of the present disclosure.

FIG. 6 is a system diagram of a camera 604 including a processor 650 in data communication with a communication device 652 to transmit timing signals from the camera 604 toward a light source. In some embodiments, the processor 650 is further in electrical communication with a camera sensor 658 (such a photoreceptor array) to capture the light signal which imaging a subject. In some embodiments, the processor 650 of the camera 604 is in data communication with a hardware storage device 656. The hardware storage device 656 may have instructions stored thereon that, when executed by the processor, cause the light source to perform any of the methods described herein.

In some embodiments, the hardware storage device 656 is any non-transient computer readable medium that may store instructions thereon. The hardware storage device 656 may be any type of solid-state memory; volatile memory, such as static random access memory (SRAM) or dynamic random access memory (DRAM); or non-volatile memory, such as read-only memory (ROM) including programmable ROM (PROM), erasable PROM (EPROM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media.

In some embodiments, the communication device 652 is a wireless communication device. For example, the wireless communication device may provide radio frequency wireless communication, such as a Wi-Fi communication device, a Bluetooth communication device, or a near-field communication NFC communication device. In other examples, the wireless communication device may provide optical wireless communications, such as an infrared wireless communication device.

In some embodiments, the communication device 652 is a wired communication device. For example, the wired communication device may provide electrical signal communication, such as a coaxial wired communication device or an Ethernet wired communication device. In another example, the wired communication device may provide optical wired signal communication, such as a fiber optic wired communication device. In some embodiments, a wired communication device may provide faster communication times with less risk of dropped data packets or interference in communication than a wireless communication device.

INDUSTRIAL APPLICABILITY

The present disclosure generally relates to systems and methods for controlling a light source. More particularly, the present disclosure relates coordinating a light source with a camera exposure to provide light during the camera exposure. High resolution imaging and three-dimensional imaging of a subject can require high levels of illumination of the subject. This high illumination, in the example a human subject, can cause discomfort to the subject.

In some embodiments, a camera used for imaging a subject has a camera exposure within a frame time. For example, a frame time of camera capturing images at 30 frames per second (FPS) is approximately 33 milliseconds (ms). The camera exposure duration for each frame is less than the frame time to allow the camera to collect a light signal with a photoreceptor array during the camera exposure duration, process the light signal, read out the frame information to memory, and reset the photoreceptor array in preparation for a second frame time. The camera, therefore, only collects a light signal during the camera exposure duration, and excess illumination of the subject during the remainder of the frame time, which can be greater than 90% of the frame time, has little to no effect on the light signal captured by the camera. The excess illumination of the subject, however, may have a negative effect on the subject.

The subject can experience discomfort or disorientation from the high level of illumination during the video recording session. In some embodiments, a light source is configured to provide high brightness illumination to the subject during at least a portion of the camera exposure duration and less illumination in the remaining frame time between the camera exposures. Illuminating the subject only during the camera exposures, however, can result in a flickering of the light source that is evident to the subject. For example, a light source that emits light for the camera exposure duration for each frame time of a 30 FPS camera (e.g., light pulses of 2 ms every 33 ms) produces a visible strobing effect that can also cause a subject discomfort or disorientation during the video recording session.

In some embodiments, systems and methods according to the present disclosure provide an exposure light pulse of sufficiently high brightness during at least a portion of the camera exposure and at least one dummy pulse during the frame time before the temporally next camera exposure and exposure light pulse. By pulsing the light source, the total light flux from the light source during a frame time is reduced while the camera receives a light signal of high brightness. In some embodiments, introducing dummy pulses into the light source pulse sequence increases the frequency of the light pulses (and decreases the duration of dead time between light pulses) such that the subject perceives a continuous light source of a lower brightness. The subject perceives the rapid light pulses as a continuous light source. The reduction in total light flux from the pulsing contributes to the perception of the continuous source. The reduction in total light flux from the light source also reduces the power consumption of the light source, reducing environmental impact. In the event of video or photography sessions in remote locations or other locations with limited electricity availability, the reduction in total light flux from the light source also reduces power consumption from a battery or other power storage, allowing for smaller batteries or longer sessions.

In some embodiments, a system for imaging a subject includes a camera and a light source in data communication with the camera. For example, the light source may include one or more light emitting diodes (LEDs). LEDS can provide nano-second response times to allow short light pulses with relatively high timing precision. In some embodiments, the camera includes an electronic shutter. The electronic shutter may be a rolling shutter or a global shutter. A rolling shutter will read a camera sensor from top to bottom. Pixels on the top of the camera sensor will switch on first for the exposure, and the active pixels of the camera sensor "roll" down to the bottom. In some embodiments, the camera includes a global shutter. Global shutters operate by exposing the whole scene from top to bottom all at once. Instead of having pixels from the top of the sensor switch on and work its way down like a scan, the sensor takes snap of the scene using all of the pixels all at once.

In some embodiments, the camera sends a timing signal to the light source to illuminate the subject. The light source emits a plurality of light pulses at least partially according to the timing signal received from the camera. In some embodiments, the timing signal includes an exposure timing that indicates to the light source when the camera exposure begins. In some embodiments, the timing signal includes an exposure duration that indicates to the light source how long the shutter of the camera remains open during the camera exposure. In some embodiments, a processor of the light source receives the timing signal from the camera and, based at least partially on the timing signal, calculates a light pulse timing including light pulse quantities and light pulse durations during the frame time.

The light source illuminates the subject during at least a portion of the camera exposure to provide a light signal to the camera. In some embodiments, the timing signal further includes a frame timing that indicates the frame rate or frame time of the camera. In some embodiments, the light source also provides at least one dummy light pulse in the frame time after the exposure light pulse and before the next camera exposure. While some embodiments described herein include a timing signal sent from the camera directly to the light source, in other embodiments, a timing controller receives the timing signal from the camera and transmits one or more light signals to the light source to control a timing of the light pulses based at least partially on the timing signal.

In some embodiments, a system has a timing controller in data communication between the camera and the light source. For example, the timing controller receives the timing signal from the camera and, based at least partially on the timing signal, calculates a light pulse timing including light pulse quantities and light pulse durations during the frame time. The timing controller then sends a light pulse instructions to the light source to illuminate the subject according to the light pulse timing.

In some embodiments, the exposure timing includes a camera exposure start time of a camera exposure. The camera exposure start time indicates when the global shutter of the camera opens (e.g., when the photoreceptor array of the camera sensor becomes active) or when the rolling shutter of the camera opens (e.g., when the first pixels of photoreceptor array of the camera sensor become active). The camera exposure has a camera exposure duration, and the exposure timing has a frame time that is the period between the camera exposures. In some embodiments, the camera exposure duration reflects the amount of time the camera sensor is active and collecting the light signal. The remaining portion of the frame time includes signal read out to memory, sensor reset, and other processes to prepare the camera sensor before then next frame.

In some embodiments, an exposure light pulse at least partially overlaps the camera exposure. In some examples, the exposure light pulse has an exposure light pulse start that is the same as the camera exposure start. In some examples, the exposure light pulse has an exposure light pulse start that is before the camera exposure start. For example, the exposure light pulse has an exposure light pulse start that is after the camera exposure start.

In some examples, the exposure light pulse has an exposure light pulse duration that is the same as the camera exposure duration. In some examples, the exposure light pulse has an exposure light pulse duration that is greater than the camera exposure duration. In some examples, the exposure light pulse has an exposure light pulse duration that is less than the camera exposure duration. In at least one example, the exposure light pulse has an exposure light pulse start that is the same as the camera exposure start and an exposure light pulse duration that is the same as the camera exposure duration such that the exposure light pulse starts and ends at the same time as the camera exposure. In at least one example, the exposure light pulse has an exposure light pulse start that is the same as the camera exposure start and the exposure light pulse has an exposure light pulse duration that is greater than the camera exposure duration to ensure the camera exposure is fully illuminated.

As described herein, a light source that provides light only during the camera exposure will ensure the camera exposure is fully illuminated, but the light source will also create a visible strobing or flicker effect to a subject. In some embodiments, the light pulse timing includes at least one dummy light pulse that provided by the light source before the next camera exposure and/or exposure light pulse. In some embodiments, the light pulse timing includes a single dummy light pulse. In some embodiments, the light pulse timing includes a plurality of dummy pulses.

Through experimentation, human subjects perceive the pulsed light source as a continuous light source when the light pulse timing provides light pulses at least 20% of the time when a dead time between light pulses (e.g., the exposure light pulses and the dummy light pulses) is less than 15 ms. For example, three light pulses of 2.2 ms each (exposure light pulse duration and dummy light pulse duration) in a 33 ms frame time provides a 20% duty cycle within the frame time (6.6 ms/33 ms=0.20).

In some embodiments, the dead time between each light pulse is equal, such that the period between the light pulses and/or light pulse starts (e.g., exposure light pulse start and dummy light pulse start) are located at equal intervals within the frame time to further create the perception of a continuous light source. For example, the dead time between the pulses is 8.8 ms in the described embodiment ((2.2 ms+8.8 ms)*3=33 ms). In some embodiments a first dead time between two light pulses and a second dead time between other light pulses are different. For example, in some embodiments, an exposure light pulse duration may be greater than a dummy light pulse duration, and a dead time therebetween may be greater than a dead time between the dummy light pulse and another light pulse.

The described embodiments includes dummy light pulse durations that are constant. In some embodiments, a dummy light pulse duration of a first dummy light pulse is greater than that of a second dummy light pulse. In some embodiments, a dummy light pulse duration of a first dummy light pulse is less than that of a second dummy light pulse.

In some embodiments, an exposure light pulse intensity is selected based at least partially on the brightness of the light signal desired at the camera sensor. In some embodiments, a dummy light pulse intensity is substantially the same as the exposure light pulse intensity. In some embodiments, a dummy light pulse intensity is greater than the exposure light pulse intensity. In some embodiments, a dummy light pulse intensity is less than the exposure light pulse intensity.

In some embodiments, an exposure light pulse and/or a dummy light pulse has a brightness value at the subject of at least 500 lux. Below 500 lux, most human subjects experience little discomfort. In some embodiments, an exposure light pulse and/or a dummy light pulse has a brightness value at the subject of at least 750 lux. In some embodiments, an exposure light pulse and/or a dummy light pulse has a brightness value at the subject of at least 1000 lux. In some embodiments, an exposure light pulse and/or a dummy light pulse has a brightness value at the subject of at least 2000 lux. Because the brightness of the light pulses is perceived as distributed over the frame time, a higher brightness can be used than would otherwise be comfortable for a user.

In some embodiments, a method of controlling a light source includes receiving a timing signal from a camera, where the timing signal includes an exposure timing. In some embodiments, the timing signal includes a camera exposure duration and/or a camera exposure start time.

In some embodiments, a means for coordinating the light source and the camera receives the timing signal and provides instructions to at least one component of the light source to provide an exposure light pulse at least partially simultaneously (e.g., temporally overlapping) with the exposure timing of the camera exposure.

In some embodiments, a means for coordinating the light source and the camera includes a processor in the light source that receives the timing signal from the camera and send an electrical signal to the LEDs or other light emitting component of the light source to provide an exposure light pulse. In some embodiments, a means for coordinating the light source and the camera includes a processor in the camera that receives the timing signal from the sensor firmware and sends instructions to at least one component of the light source to provide an exposure light pulse. In some embodiments, a means for coordinating the light source and the camera includes a timing controller in data communication with the light source and that receives the timing signal from the camera.

The method further includes providing instructions to at least one component of the light source to provide a dummy light pulse at least partially simultaneously (e.g., temporally overlapping) with the exposure timing of the camera exposure. In some embodiments, the means for coordinating the light source and the camera calculates a dummy pulse timing of the dummy light pulse based at least partially on the timing signal. For example, the timing signal includes a frame time. In some embodiments, calculating a dummy pulse timing of the dummy light pulse based at least partially on the timing signal by dividing the frame time into equal intervals and setting the exposure light pulse start and the dummy light pulse start(s) at the equal intervals.

In some embodiments, the method includes providing a plurality of light pulses (i.e., exposure light pulse and dummy light pulse(s)) based on ensuring the light pulses sum to at least 20% of the frame time and a dead time between light pulses is no greater than 15 ms. In some embodiments, the method includes providing a plurality of light pulses (i.e., exposure light pulse and dummy light pulse(s)) based on ensuring the light pulses sum to at least 25% of the frame time and a dead time between light pulses is no greater than 10 ms.

In some embodiments, a light source includes a processor in data communication with a communication device to receive timing signals from a camera. The processor is further in electrical communication with the light emitting component (such an LED array) to control the light pulses from the light source. In some embodiments, the light emitting component includes or is partially controlled by a pulse width modulator (PWM). In some embodiments, the pulse intensity is regulated by at least a 20 kilohertz (kHz) PWM. In some embodiments, the pulse intensity is regulated by at least a 50 kHz PWM. In some embodiments, the pulse intensity is regulated by at least a 100 kHz PWM.

In some embodiments, the processor of the light source is in data communication with a hardware storage device. The hardware storage device may have instructions stored thereon that, when executed by the processor, cause the light source to perform any of the methods described herein.

In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (EPROM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media.

In some embodiments, the communication device is a wireless communication device. For example, the wireless communication device may provide radio frequency wireless communication, such as a Wi-Fi communication device, a Bluetooth communication device, or a near-field communication NFC communication device. In other examples, the wireless communication device may provide optical wireless communications, such as an infrared wireless communication device.

In some embodiments, the communication device is a wired communication device. For example, the wired communication device may provide electrical signal communication, such as a coaxial wired communication device or an Ethernet wired communication device. In another example, the wired communication device may provide optical wired signal communication, such as a fiber optic wired communication device. In some embodiments, a wired communication device may provide faster communication times with less risk of dropped data packets or interference in communication than a wireless communication device.

In some embodiments, a camera includes a processor in data communication with a communication device to transmit timing signals from the camera toward a light source. In some embodiments, the processor is further in electrical communication with a camera sensor (such a photoreceptor array) to capture the light signal which imaging a subject. In some embodiments, the processor of the camera is in data communication with a hardware storage device. The hardware storage device may have instructions stored thereon that, when executed by the processor, cause the light source to perform any of the methods described herein.

In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (EPROM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media.

In some embodiments, the communication device is a wireless communication device. For example, the wireless communication device may provide radio frequency wireless communication, such as a Wi-Fi communication device, a Bluetooth communication device, or a near-field communication NFC communication device. In other examples, the wireless communication device may provide optical wireless communications, such as an infrared wireless communication device.

In some embodiments, the communication device is a wired communication device. For example, the wired communication device may provide electrical signal communication, such as a coaxial wired communication device or an Ethernet wired communication device. In another example, the wired communication device may provide optical wired signal communication, such as a fiber optic wired communication device. In some embodiments, a wired communication device may provide faster communication times with less risk of dropped data packets or interference in communication than a wireless communication device.

The present disclosure relates to systems and methods for controlling a light source according to at least the examples provided in the sections below:

[A1] In some embodiments, an electronic device includes a light source, a communication device, a processor in data communication with the light source and the communication device, and a hardware storage device in data communication with the processor. The hardware storage device has instructions stored thereon that, when executed by the processor, cause the electronic device to receive a timing signal from a camera, where the timing signal includes an exposure timing of a camera exposure; provide an exposure light pulse from the light source simultaneously with the camera exposure; and after providing the exposure light pulse, provide a dummy light pulse that does not overlap with a camera exposure.

[A2] In some embodiments, the light source of [A1] includes at least one light emitting diode.

[A3] In some embodiments, the light source of [A1] or [A2] further includes an at least 20 kilohertz pulse width modulator configured to regulate a pulse intensity.

[A4] In some embodiments, the communication device of any of [A1] through [A3] is a wired communication device.

[A5] In some embodiments, the exposure light pulse of any of [A1] through [A4] has a brightness of at least 500 lux.

[B1] In some embodiments, a system includes a light source, a camera, and a means for coordinating the camera and light source. The means for coordinating the light source and the camera is configured to coordinate a first exposure of the camera with a first exposure light pulse of the light source, a second camera exposure of the camera with a second exposure light pulse of the light source, and at least one dummy light pulse of the light source between the first exposure and the second exposure.

[B2] In some embodiments, the means for coordinating of [B1] includes a controller in data communication with the camera and the light source.

[B3] In some embodiments, the means for coordinating of [B1] includes a processor in the light source, where the processor is configured to receive an exposure timing from the camera.

[B4] In some embodiments, the means for coordinating of [B1] includes a processor in the camera, where the processor is configured to transmit exposure timings and dummy timings to the light source.

[B5] In some embodiments, the camera of any of [B1] through [B4] has a global shutter.

[C1] In some embodiments, a method of providing light to a subject includes receiving a timing signal from a camera, wherein the timing signal includes an exposure timing of a camera exposure; providing an exposure light pulse simultaneously with at least a portion of the camera exposure; and providing a dummy light pulse after the exposure light pulse that is not simultaneous with any camera exposure with a dead time between the exposure light pulse and dummy light pulse.

[C2] In some embodiments, the timing signal of [C1] includes an exposure duration and the exposure light pulse has an exposure light pulse duration longer than the exposure duration.

[C3] In some embodiments, the timing signal of [C1] or [C2] includes a frame time between exposures and the dummy light pulse begins at an equal interval within the frame time.

[C4] In some embodiments, the dummy light pulse of any of [C1] through [C3] is a first dummy light pulse and the method further comprises providing a second dummy light pulse after the first dummy light pulse at a second equal interval.

[C5] In some embodiments, a total duty cycle of a light source of any of [C1] through [C4] in a frame time is at least 20%.

[C6] In some embodiments, the timing signal of any of [C1] through [C5] includes a frame time between exposures and the method further comprises providing a second exposure light pulse after the frame time

[C7] In some embodiments, the exposure light pulse of any of [C1] through [C6] has an exposure light intensity and the dummy light pulse has a dummy light intensity, and the exposure light intensity and the dummy light intensity are equal.

[C8] In some embodiments, the dead time of any of [C1] through [C7] is no more than 15 ms.

[C9] In some embodiments, the exposure light pulse of any of [C1] through [C8] has an exposure light duration and the dummy light pulse has a dummy light duration, and the exposure light duration and the dummy light duration are equal.

[C10] In some embodiments, the dummy light pulse of [C9] is a first dummy light pulse and the method further comprises providing a second dummy light pulse after the first dummy light pulse, wherein the second dummy light pulse has a second dummy light duration, and the dummy light duration and the second dummy light duration are equal.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic device comprising:
   a light source;
   a communication device;
   a processor in data communication with the communication device and the light source; and
   a hardware storage device in data communication with the processor, the hardware storage device having instructions stored thereon that, when executed by the processor, cause the electronic device to:
      receive a timing signal from a camera for a frame time, wherein the timing signal includes an exposure timing of a camera exposure,
      provide an exposure light pulse within the frame time from the light source simultaneously with the camera exposure,
      provide a dead time after the exposure light pulse within the frame time in which no light is emitted, and
      after providing the dead time, provide a dummy light pulse within the frame time that does not overlap with a camera exposure.

2. The electronic device of claim 1, wherein the light source includes at least one light emitting diode.

3. The electronic device of claim 1, wherein the light source further includes an at least 20 kilohertz pulse width modulator configured to regulate a pulse intensity.

4. The electronic device of claim 1, wherein the communication device is a wired communication device.

5. The electronic device of claim 1, wherein the exposure light pulse has a brightness of at least 500 lux.

6. A system for imaging a subject, the system comprising:
   a light source;
   a camera; and
   a means for coordinating:
      a first camera exposure of the camera with a first exposure light pulse of the light source,
      a second camera exposure of the camera with a second exposure light pulse of the light source,
      at least one dummy light pulse of the light source between the first exposure and the second exposure,
      a first dead time between the first exposure light pulse and the at least one dummy light pulse, and
      a second dead time between the at least one dummy light pulse and the second exposure light pulse.

7. The system of claim 6, wherein the means for coordinating includes a controller in data communication with the camera and the light source.

8. The system of claim 6, wherein the means for coordinating includes a processor in the light source, wherein the processor is configured to receive an exposure timing from the camera.

9. The system of claim 6, wherein the means for coordinating includes a processor in the camera, wherein the processor is configured to transmit exposure timings and dummy timings to the light source.

10. The system of claim 6, wherein the camera has a global shutter.

11. A method of providing light to a subject, the method comprising:
   receiving a timing signal from a camera, wherein the timing signal includes an exposure timing of a camera exposure;

providing an exposure light pulse with a light source simultaneously with at least a portion of the camera exposure; and providing a dummy light pulse after the exposure light pulse that is not simultaneous with any camera exposure with a dead time during which no light is emitted from the light source between the exposure light pulse and dummy light pulse.

12. The method of claim 11, wherein the timing signal includes an exposure duration and the exposure light pulse has an exposure light pulse duration longer than the exposure duration.

13. The method of claim 11, wherein the timing signal includes a frame time between exposures and the dummy light pulse begins at an equal interval within the frame time.

14. The method of claim 13, wherein the dummy light pulse is a first dummy light pulse and the method further comprises providing a second dummy light pulse after the first dummy light pulse at a second equal interval.

15. The method of claim 11, wherein a total duty cycle of a light source in a frame time is at least 20%.

16. The method of claim 11, wherein the timing signal includes a frame time between exposures and the method further comprises providing a second exposure light pulse after the frame time.

17. The method of claim 11, wherein the exposure light pulse has an exposure light intensity and the dummy light pulse has a dummy light intensity, and the exposure light intensity and the dummy light intensity are equal.

18. The method of claim 11, wherein the dead time is no more than 15 milliseconds.

19. The method of claim 11, wherein the exposure light pulse has an exposure light duration and the dummy light pulse has a dummy light duration, and the exposure light duration and the dummy light duration are equal.

20. The method of claim 19, wherein the dummy light pulse is a first dummy light pulse and the method further comprises providing a second dummy light pulse after the first dummy light pulse, wherein the second dummy light pulse has a second dummy light duration, and the dummy light duration and the second dummy light duration are equal.

* * * * *